US011086850B2

(12) United States Patent
Ivanova et al.

(10) Patent No.: US 11,086,850 B2
(45) Date of Patent: Aug. 10, 2021

(54) PERSISTING OF A LOW LATENCY IN-MEMORY DATABASE

(75) Inventors: Natalia V. Ivanova, Austin, TX (US); Edward McCarthy, Barton (AU); Angel Nunez Mencias, Boeblingen (DE); Roland Seiffert, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 1058 days.

(21) Appl. No.: 13/442,900

(22) Filed: Apr. 10, 2012

(65) Prior Publication Data

US 2012/0265743 A1 Oct. 18, 2012

(30) Foreign Application Priority Data

Apr. 13, 2011 (EP) .................................... 11162181

(51) Int. Cl.
*G06F 16/23* (2019.01)
(52) U.S. Cl.
CPC ................ *G06F 16/2379* (2019.01)
(58) Field of Classification Search
CPC ...................... G06F 17/30368; G06F 16/2379
USPC ....................................................... 707/702
See application file for complete search history.

(56) References Cited

U.S. PATENT DOCUMENTS

| 6,253,212 | B1 | 6/2001 | Loaiza et al. |
| 6,453,325 | B1* | 9/2002 | Cabrera ............... G06F 11/1461 |
| 7,113,953 | B2 | 9/2006 | Brown et al. |
| 8,433,684 | B2* | 4/2013 | Ruiz Munoz ................ 707/649 |
| 9,075,772 | B2* | 7/2015 | Kawada ............... G06F 11/1458 |
| 2003/0061537 | A1* | 3/2003 | Cha ..................... G06F 11/2094 714/16 |
| 2005/0033875 | A1* | 2/2005 | Cheung et al. ................ 710/29 |

(Continued)

FOREIGN PATENT DOCUMENTS

KR 2047601 A 6/2002

OTHER PUBLICATIONS

Choi, Mi-Seon et al., "Two-Step Backup Mechanism for Real-Time Main Memory Database Recovery," RTCSA '00 Proceedings of the Seventh International Conference on Real-Time Systems and Applications, 2000 (no further date information available), pp. 453-457.

(Continued)

*Primary Examiner* — Boris Gorney
*Assistant Examiner* — Griselle C Roland
(74) *Attorney, Agent, or Firm* — Heslin Rothenberg Farley & Mesiti P.C.; Steven Chiu, Esq.

(57) ABSTRACT

Processing is provided for operating an in-memory database, wherein transaction data is stored by a persistence buffer in an FIFO queue, and update processor subsequently: waits for a trigger; extracts the last transactional data associated with a single transaction of the in-memory database from the FIFO memory queue; determines if the transaction data includes updates to data fields in the in-memory database which were already processed; and if not, then stores the extracted transaction data to a store queue, remembering the fields updated in the in-memory database, or otherwise updates the store queue with the extracted transaction data. The process continues until the extracting is complete, and the content of the store queue is periodically written into a persistent storage device.

9 Claims, 6 Drawing Sheets

(56) References Cited

U.S. PATENT DOCUMENTS

| | | | |
|---|---|---|---|
| 2005/0273527 A1* | 12/2005 | Olstad | G06F 16/2358 |
| | | | 710/56 |
| 2006/0004860 A1 | 1/2006 | Liedes et al. | |
| 2006/0167895 A1 | 7/2006 | Shim | |
| 2007/0277056 A1* | 11/2007 | Varadarajan | G06F 11/1438 |
| | | | 714/15 |
| 2008/0222159 A1* | 9/2008 | Aranha | G06F 16/21 |
| 2011/0041006 A1* | 2/2011 | Fowler | 714/10 |
| 2012/0109895 A1* | 5/2012 | Zwilling | G06F 11/1471 |
| | | | 707/648 |
| 2013/0066977 A1* | 3/2013 | Katti et al. | 709/206 |
| 2013/0117235 A1* | 5/2013 | Schreter | 707/682 |

OTHER PUBLICATIONS

Lee, Dongho et al., "Checkpointing Schemes for Fast Restart in Main Memory Database Systems," 1997 IEEE Pacific Rim Conf. on Communications, Computers, and Signal Processing (no further date information available), pp. 663-668.

\* cited by examiner

PERSISTING OF A LOW LATENCY IN-MEMORY DATABASE

PRIOR FOREIGN APPLICATION

This application claims priority from European patent application number EP11162181.9, filed Apr. 13, 2011, which is hereby incorporated herein by reference in its entirety.

BACKGROUND

The present invention relates in general to the field of real-time processing of data streams. More specifically, this invention pertains to a system and method for efficiently writing data from an in-memory database to a persistent memory.

Many applications need the fast response and high throughput that is typical of in-memory databases, but also need the reliability and recoverability of traditional disk based relational database management systems. What these applications require is a method for copying data from the in-memory database to a persistent memory, such that the data can be easily recovered in the event of a machine crash.

Minimizing the lag time between the data written to the in-memory database and subsequently written to the persistent memory is important. This lag should be as short as possible to minimize the loss of data in the event of a machine crash. In addition, if the data copied to the persistent memory is time stamped then the persistent memory effectively represents the state of the in-memory database over time. This allows for the possibility of recreating the in-memory database from the persistent memory for any point in time.

Conventional technologies that store streaming data in a buffer memory and then transfer this data to an on-disk database have relatively long lag times between arrival of the data and the transfer to the database.

The U.S. Pat. No. 7,113,953 B2 describes an efficient system, where an in-memory database is synchronized with a relational database management system with a lag time on the order of seconds. But this system requires that the operations of the in-memory database are limited to insert only operations such that update operations are not allowed. This restricts the class of real-time applications significantly. Examples are in-memory databases for financial market data.

For applications such as in-memory game database management systems for massively multiplayer online games (MMOG) this restriction is not feasible as update operations cannot be omitted. In a MMOG the game database needs to store information about all the objects and players on the game and hosts business critical information therefore. As a MMOG needs to support hundreds or even thousands of players simultaneously, the game database can require a huge amount of space. The scalability of a MMOG in terms of numbers of players and game objects depends mostly on the scalability of its object model and the game transaction rate that must be visible to all players in the same part of the world of the game. Therefore, the performance of the game database management system determines the overall performance and responsiveness of the online game.

State of the art MMOGs use game database management systems which partition the game users into disjoint groups such that members of different groups can never meet, or which partition the game world into disjoint spaces, or which use both approaches. The partitioning is achieved by using multiple small, cheap and unreliable server machines and by splitting the data of the game database between these machines. However, this adds latency to the database operations due to the additional overhead for the operation and control of the machines.

BRIEF SUMMARY

According to one embodiment of the present invention, a method to operate a volatile in-memory database is presented which comprises: the in-memory database subsequently performing: a) receiving a transaction to modify content of the in-memory database; b) storing transaction data associated with the transaction in the in-memory database; c) determining if an active FIFO memory queue in a persistence buffer is full; d) if the active FIFO memory queue is full, setting a trigger for an update processor and selecting another FIFO memory queue as active; e) storing the associated transaction data in the active FIFO memory queue; f) continuing with the receiving a); wherein steps b) to e) are performed as part of the commit function of the in-memory database, and: the update processor in parallel to the in-memory database subsequently performs: g) waiting for the trigger; h) extracting the last transaction data associated to a single transaction of the in-memory database from the FIFO memory queue; i) determining if the transaction data comprises updates to data fields in the in-memory database which were already processed since step g) was performed; j) if not then storing the extracted transaction data to a store queue and remembering the fields updated in the in-memory database; otherwise, updating the store queue with the extracted transaction data; and k) continuing with step h).

According to another embodiment of the invention, a data processing system is proposed, which comprises a volatile in-memory database and an update processor, wherein the in-memory database and the update processor comprise means to implement the method described above.

DETAILED DESCRIPTION OF EXEMPLARY EMBODIMENTS

Figure 1:
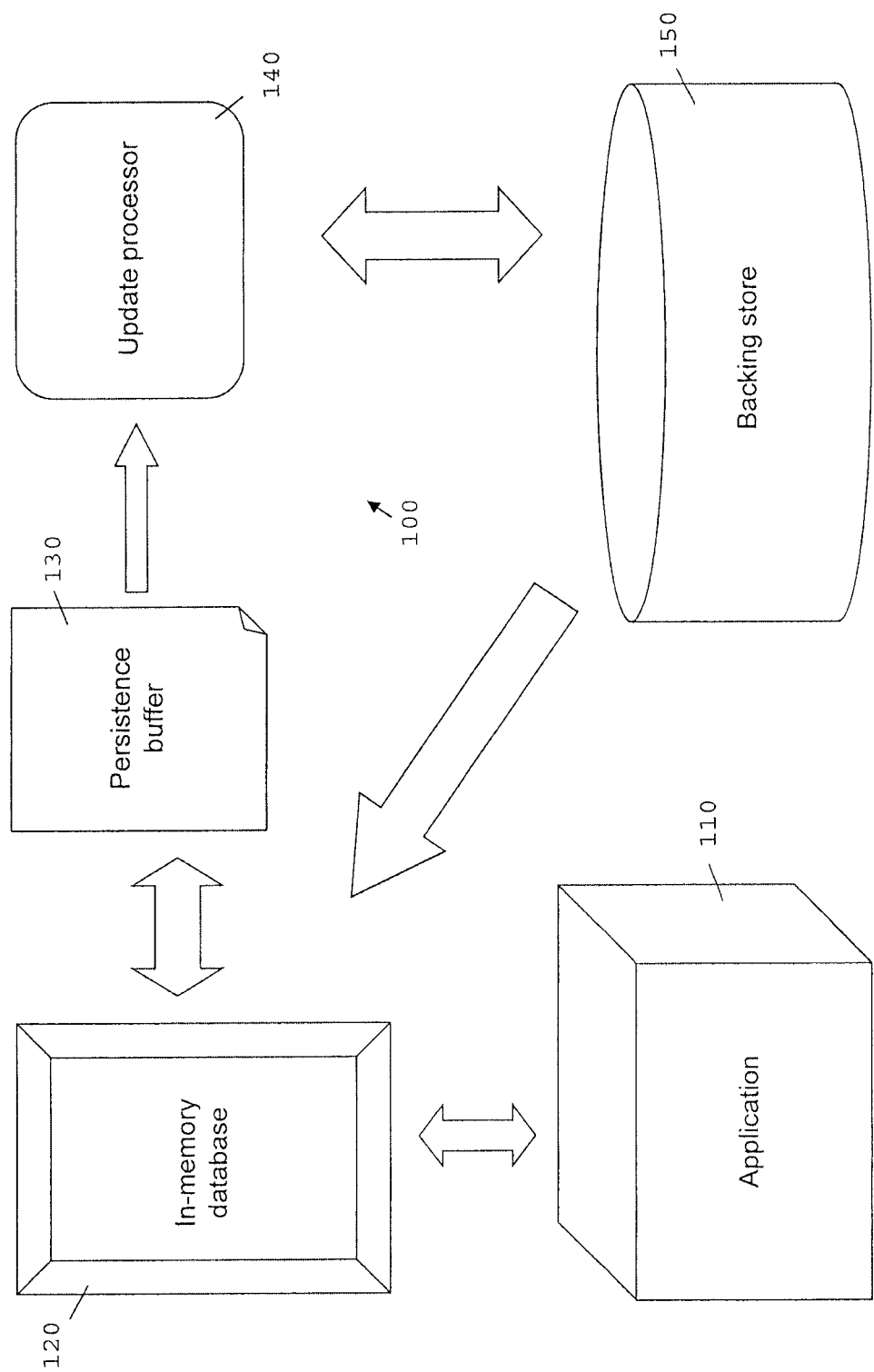
FIG. 1: Is a schematic block diagram illustrating a data processing system, in accordance with the present invention.

FIG. 1 illustrates a data processing system 100 in accordance with the present invention. An application 110 exchanges data with an in-memory database 120. The in-memory database 120 uses a persistence buffer 130 to persistently store data in a backing store 150. The stored data can also be retrieved by the in-memory database 120 from the backing store 150. The data is stored from the persistence buffer 130 to the backing store by an update processor 140.

In one embodiment of the invention, the application 110 is an MMOG supporting multiple players. For example, a possible MMOG is an application 110 which allows a player to buy a virtual drink for e.g. $3 from another player at a virtual bar using virtual money accounts for the players. The application 110 calls the in-memory database 120 to process a transaction to move $3 from the buyers account to purchasers account within the application 110. The in-memory database 120 then processes the transaction and stores the new values.

In pseudocode this transaction can be described as:

```
begin transaction;
set a.x=a.x−3;
set b.x=b.x+3;
commit;
```

If the buyer had $15 and the purchaser had $14 before the transaction, then the transaction will result in a.x=12 and b.x=17.

In one embodiment of the invention, the in-memory database 120 is an object-oriented database. This allows to easily manage the game data, which can be represented in form of data objects. Each player can be represented as a data object to which comprises further objects. In the example above, the players are represented by the objects "a" and "b" which comprise an object "x" each, which represents the respective accounts of the players. But the in-memory database 120 can also be a relational database management system (RDBMS) for example, which does not support persistent data.

The "commit" function of the in-memory database 120 is adapted such that upon success instead of just returning to the calling application 110 it will remember the update. This is done by intercepting the commit function and writing a "transaction record" from the in-memory database 120 to the persistence buffer 130. In pseudocode this transaction record can be described as:

```
transaction record
<unique timestamp>
a.x=12;
b.x=17;
```

In one embodiment, with an object-oriented in-memory database 120 the transaction record could comprise the entire data objects that are modified during the transaction. But this would consume too much memory. Therefore, at least the data fields from the modified objects that are changed during the transaction need to be comprised within the transaction record in order to save as much space as possible. In that case, those updated data fields are stored together with an object identifier in the transaction record to ensure that these data fields can be associated to the respective object.

Figure 3:
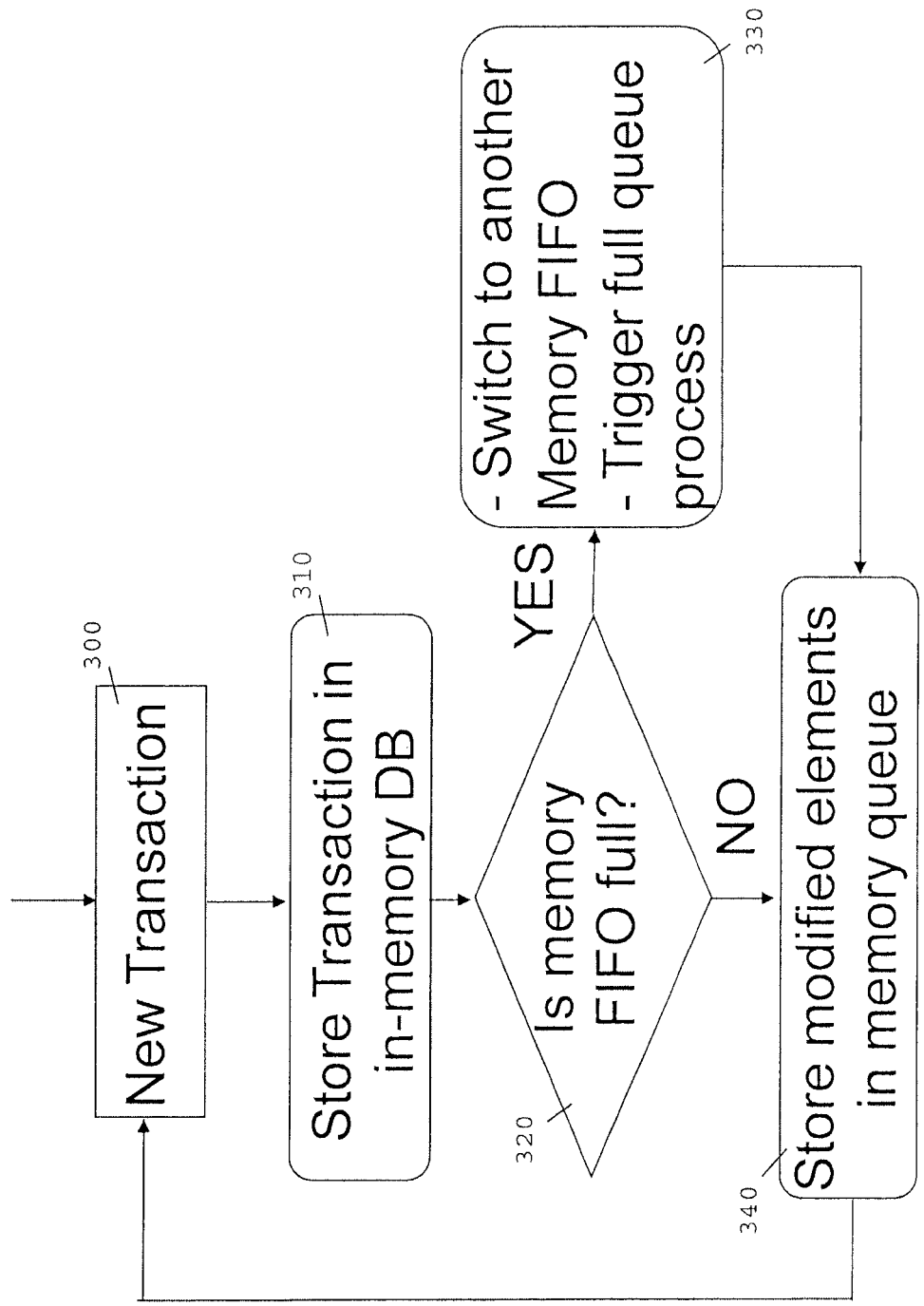
FIG. 3: Is a flow diagram illustrating a method to process transactions, in accordance with the present invention.

FIG. 3 shows the creation of a new transaction of the application 110 in step 300. The new transaction is then stored in the in-memory database 120 in step 310. When the corresponding transaction record is written by the in-memory database 120 to the persistence buffer 130 as part of the interception of the commit function, the persistence buffer 130 inserts the current timestamp to the transaction record and stores it in one of its buffer storage areas, e.g., by appending the transaction record to the end of a sequential file. The timestamp is assumed to be unique which can be guaranteed by well-known methods.

Once this is completed and the record is safe the persistence buffer 130 signals the successful storage of the transaction record to the in-memory database 120. The in-memory database 120 then notifies the application 110 that the update transaction completed successfully, i.e., the commit function returns without errors. In case of failures by writing the transaction record to the persistence buffer 130, the commit function fails, the usual "unrolling" of the transaction is triggered by the in-memory database 120 and the application 110 is informed that the transaction failed.

Figure 2:
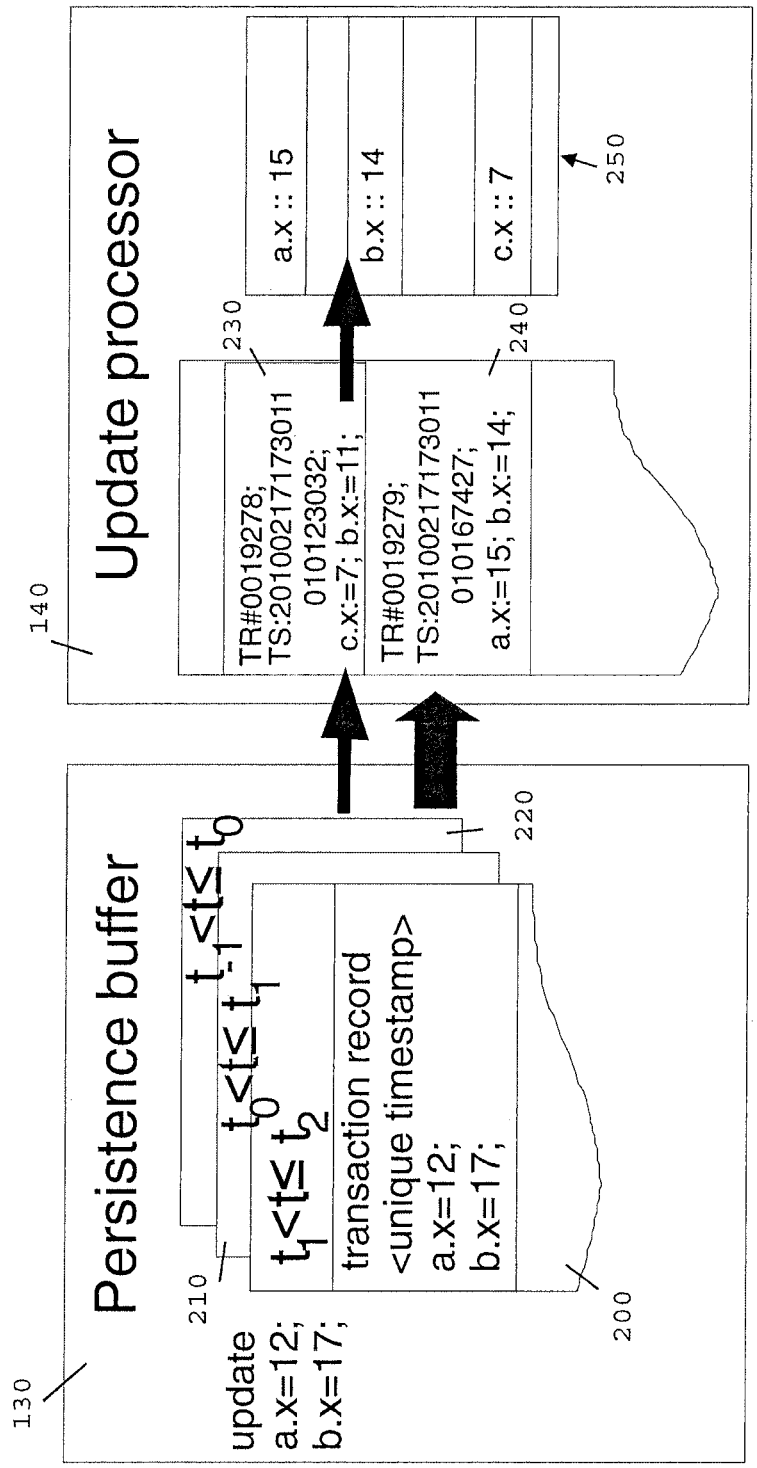
FIG. 2: Is a schematic block diagram illustrating a persistence buffer and an update processor, in accordance with the present invention.

The persistence buffer 130 stores the transaction records in one of its FIFO (First-In First-Out) buffer storage areas. In the simplest case, there is one active FIFO buffer to which all incoming transaction records are appended. There may be one or more FIFO buffers that are "complete". Each of these FIFO buffers contains all of the transaction records between two unique timestamps. The FIFO buffers do not overlap as far as the timestamps of the transaction records are concerned. For example, FIG. 2 shows such buffers 200, 210, and 220 in the persistence buffer 130. FIFO buffer 200 represents the transaction record from the example above, wherein the amount of money owned by the purchaser and the buyer is adapted as a result of the sale of the virtual drink.

It is possible that the capacity of a FIFO buffer is exceeded. In that case, no further transaction records can be stored in this full FIFO buffer. Therefore, in step 320 shown in FIG. 3 the persistence buffer 130 determines if the active FIFO buffer is already full. If that is the case, then the persistence buffer 130 will switch to another FIFO buffer in step 330. This FIFO buffer is then marked as active. Otherwise, the persistence buffer will store the transaction record in-order in the active FIFO buffer in step 340.

The oldest of the unprocessed data sets in the persistence buffer 130 will be processed now by the update processor 140. The newest timestamp in the dataset is t0. The data set may be large, so it will not be physically copied, but accessed on a per transaction record basis. The data set will be sorted into a data structure set such that for each value changed during the transaction processing timeframe represented by this data set the newest value is kept.

FIG. 2 shows an oldest data set 230 and a newer data set 240. Both data sets contain an identifier (TR) for the associated transaction record and the time stamp (TS) of the transaction record. The newer data set 240 represents the transaction that immediately preceded the example above, wherein the current amount of money owned by the purchaser and buyer is defined. The oldest data set 230 is sorted in data structure set 250 by the update processor 140. Then the newer data set 240 is processed by the update processor 140, which results in the data structure set 250 as shown in FIG. 2.

A possible implementation for a persistence buffer data set is a sequential file, which can be maintained in a main memory of a computer system. During transaction processing (while the buffer/data set is active), new transaction records are simply appended. The update processor 140 reads the file sequentially from beginning to end. The "sorting-in" step 340 becomes trivial then: If a newly read transaction record updates a field already recorded, its timestamp is checked. If it is newer then the one associated with the recorded update, then the new value and timestamp is remembered. If it is older, then it is ignored. Therefore, one sequential read is enough, no matter in what order the records are stored in or retrieved from the data set.

Figure 4:
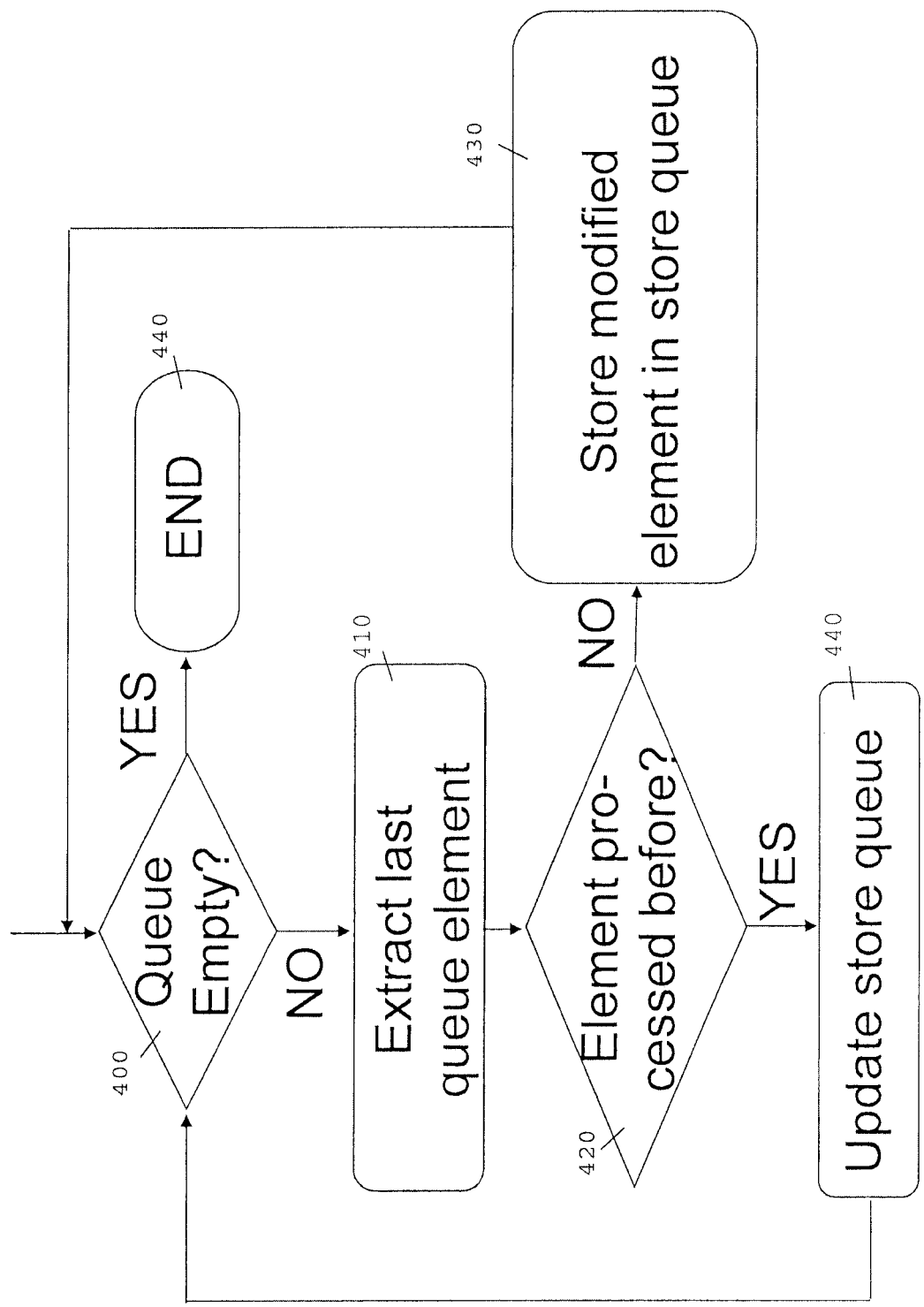
FIG. 4: Is a flow diagram illustrating a method to process a queue of modified elements, in accordance with the present invention.

When the persistence buffer 130 switches to another FIFO buffer in step 330, then also a full queue process is triggered. The update processor 140 will then extract all the transaction records stored in the full FIFO buffer. This is shown in FIG. 4. In step 400 the update processor 140 will determine if the queue of the FIFO buffer is already empty. If that is the case, then the update processor 140 stops its transaction processing in step 440. Otherwise, the last transaction record is extracted from the FIFO buffer in step 410. Then it will be determined in step 420 if the extracted transaction record was already processed before during the extraction of the queue. If that is not the case, then the transaction record is stored in a store queue of the update processor (140) and the execution is then continued with step 400. Otherwise, the store queue is updated with the transaction record in step 440. After the store queue was updated, the update processor (140) continues with step 400.

Figure 5:
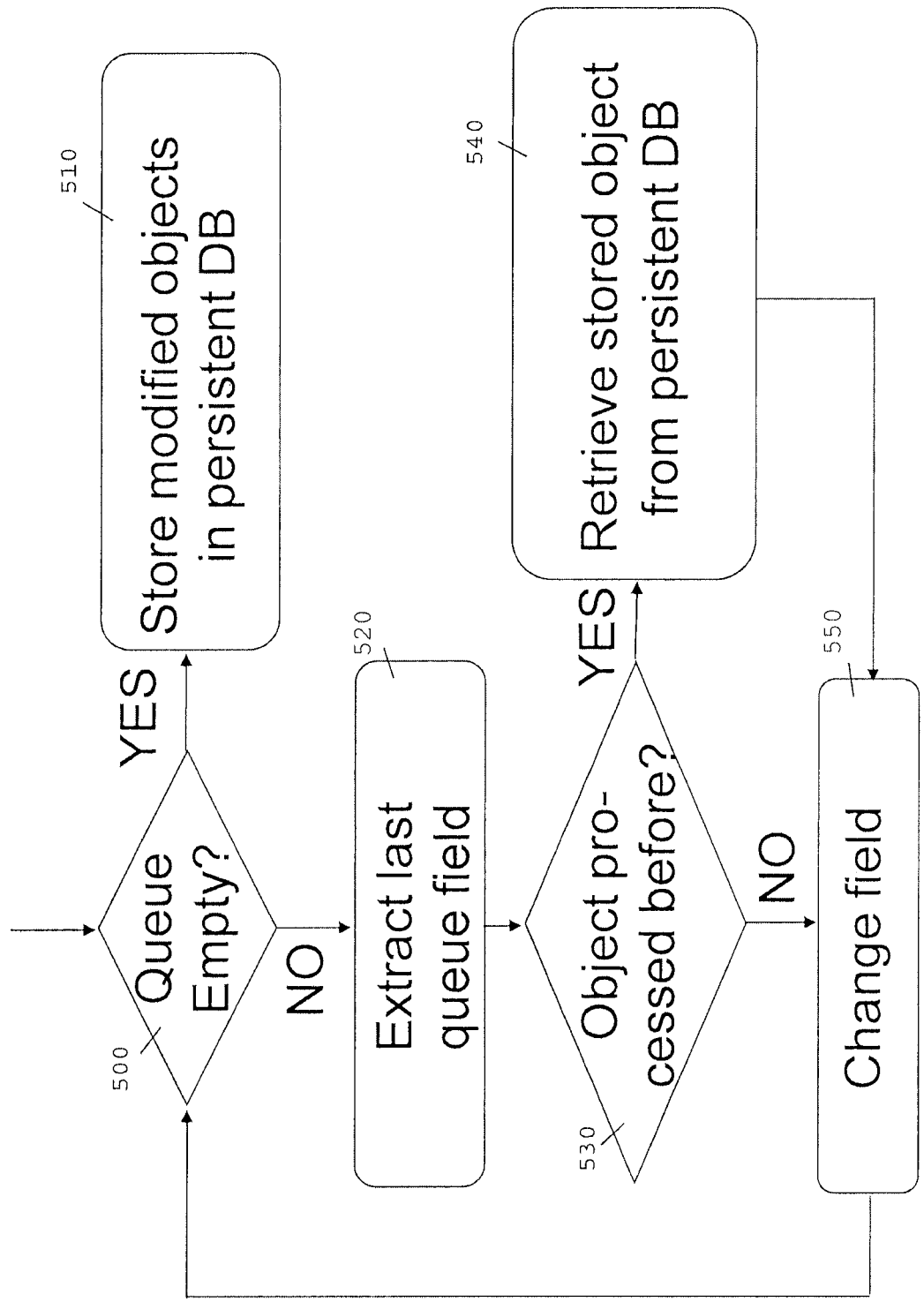
FIG. 5: Is a flow diagram illustrating a method to process a queue of modified fields, in accordance with the present invention.

The update of the store queue in step 440 can be implemented easily for those embodiments that store the entire modified objects within the transaction records. In that case the extracted transaction record can be ignored in case its timestamps indicates that it is older than the one already stored in the store queue. For other embodiments it is required to update the fields within the objects only, that are affected by the transaction records. An implementation is shown in FIG. 5, which is an adaptation of the method shown in FIG. 4. In this example, the objects are related to fields within database objects, which can therefore be stored in a temporary empty in-memory database. The transaction records are then stored in the persistence buffer as a sequence of objects relating to the updated fields.

In step 500 of FIG. 4, the update processor 140 will determine if the queue of the FIFO buffer is already empty. If that is the case, then the update processor 140 stops its transaction processing in step 510 after it stored the modified objects from the store queue in the persistent database on the backing store 150. Otherwise, the last queue field is extracted from the FIFO buffer in step 520. Then it will be determined in step 530 if the extracted object was already processed before during the extraction of the queue. If that is not the case, then the respective fields in the object are updated and stored in a store queue of the update processor (140) and the execution is then continued with step 500. Otherwise, the object is retrieved from the persistent database in step 440. After the store queue was updated, the update processor (140) continues with step 400.

The content of the store queue is periodically written by the update processor (140) to the backing store (150). In the simplest case, the backing store 150 is a standard database management system with persistent storage devices, which maintains a database and the new values for the changed fields are just updated in this database. So the next time this database is loaded in the in-memory database 120 it represents a consistent overall state for a certain point in time t0. Advantageous embodiments of the invention use computer systems with multiple logical partitions. One of these partitions can then execute the application 110 and the in-memory database 120. Another partition can execute the persistence buffer 130 and the update processor 140. This partition can also execute the database management system for the backing store 150. In the preferred embodiment of the invention, the application 110 and the in-memory database 120 are executed on the same computer system, whereas the persistence buffer 130 and the update processor 140 are executed on a different physical computer system.

The in-memory database 120 and the persistence buffer 130 communicate via a network connection. In a special embodiment, the persistence buffer 130 and the update processor 140 could be executed twice on two different computer systems in order to obtain redundancy to improve the system reliability.

In a different embodiment of the invention recovery for different points in time is possible. One embodiment just stores the set of fields/values for t0, for example, in a file that is associated with t0. The original data is not updated. At a convenient point in time, old update files, i.e., all files representing updates before a user-specified point in time—are eliminated by applying them to the original data in chronological order thereby creating a new original dataset for the processing to continue as described above.

The details of how many update files to keep, whether or when to apply them, etc. has to be part of the overall solution for managing the data processing system 100 and can be derived from the needs of its users in terms of recoverability.

The completion of the update to the backing store 150 is acknowledged. The update processor 140 can now clean up all data structures related to the previously processed data set for t0. It may fetch the next, finished data set and continue processing. The update processing is completely asynchronous to the transaction processing.

When the application 110 or the in-memory database 120 fails, or the system administrator of the data processing system 100 stops transaction processing in order to reset to a previous stage then the persistence buffer 130 will deactivate the current buffer data set and stop processing further transactions. Then the buffers in the persistence buffer 130 will be marked as inactive and handled by the update processor 140 as described above. All updates will be reflected in the backing store 150, again as described above.

The in-memory database 120 is reloaded with the data from the backing store 150 either with the newest possible state or an administrator-defined level some time back, by selecting one of the recoverable states held in the backing store. Now the application 110 can be restarted. Additional administrative tasks may be necessary. For example, if the restart is required because of an inconsistency, a reset to a state corresponding to t1 may make it necessary to remove all newer snapshots t1+i from the backing store—otherwise the timeline would fork.

An example for a realistic scenario of the workload for the application 110 could be a mixture of action and strategy game, which can be characterized as follows:
  1 million subscribed users;
  100,000 concurrently active users;
  100 objects per user (which can participate in transactions);
  100 bytes per object;
  20% of the users show high activity (flying, shooting, . . . ) generating 10 transactions per second;
  80% of the users show low activity (thinking, trading, socializing, . . . ) generating 0.1 transactions per second;
  an average of 2 objects modified per transaction.

For this example a database size of at least 10 GB is necessary:

1 million users*100 objects/user=100 million objects 100 million objects*100 bytes/object=10 GB.

When it is assumed that full objects are recorded upon change, then transaction volumes are in the range of 208 k transactions/second in this example:

100 k users*20%*10 transactions/second+100 k users*80%*0.1 transactions/second

This results in a data rate of 41.600M Bytes/second:

208 k transactions/second*2 objects/transaction*100 bytes/object

So in one embodiment of the invention, the in-memory database 120 and the persistence buffer 130 can be connected with a single network connection using state of the art network technology.

When it is further assumed that a single buffer records the transactions of 1 hour of gaming, then the buffer contains:

41.600M Bytes/second*3600 seconds=149,760M Bytes~150 GB 208 k transactions/second*2 objects/transaction*3600 seconds=1,497.600M object updates.

When it is also assumed that during one hour 200,000 players are active at least once, then during that hour 200,000 users*100 objects/user=20M objects may potentially be touched.

Assuming in the worst case for the invention that the modification of objects is uniformly distributed over time, then each object will be modified ~75 times during one hour:

1,497.6M objects modified/20M total objects.

Since the update processor 140 only needs to actually store the last update for each object, one can save ~99% of the updates to the backing store 150, which in fact would make it feasible now to use a standard RDBMS to implement the backing store 150.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 6:
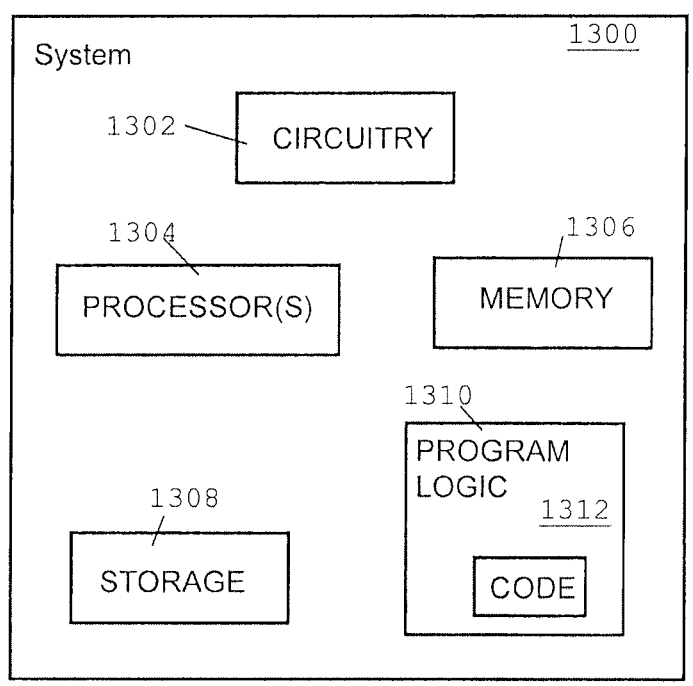
FIG. 6: Is a schematic block diagram of a computer system in which certain embodiments of the present invention may be implemented.

FIG. 6 illustrates a block diagram of a computer system 1300 in which certain embodiments may be implemented. The system 1300 may include a circuitry 1302 that may in certain embodiments include a microprocessor 1304. The computer system 1300 may also include a memory 1306 (e.g., a volatile memory device), and storage 1308. The storage 1308 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 1308 may comprise an internal storage device, an attached storage device and/or a network accessible storage device. The system 1300 may include a program logic 1310 including code 1312 that may be loaded into the memory 1306 and executed by the microprocessor 1304 or circuitry 1302. In certain embodiments, the program logic 1310 including code 1312 may be stored in the storage 1308. In certain other embodiments, the program logic 1310 may be implemented in the circuitry 1302. Therefore, while FIG. 6 shows the program logic 1310 separately from the other elements, the program logic 1310 may be implemented in the memory 1306 and/or the circuitry 1302.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of operating a volatile in-memory database comprising:

processing, by the in-memory database, a transaction to modify content of the in-memory database, wherein the transaction comprises an update, the processing comprising:

receiving, by the in-memory database, from an application comprising a massively multiplayer online game (MMOG), wherein the MMOG supports multiple players, wherein each player is represented by an object comprising additional objects, the transaction, wherein the in-memory database and the application are executed by a first logical partition of a computer system;

executing, by the in-memory database, a commit function of the in-memory database, wherein the commit function of the in-memory database stores transaction data associated with the transaction in the in-memory database and intercepting the commit function to write the associated transaction data to a first FIFO memory queue in a persistence buffer by appending a record of the transaction to a sequential file before notifying the application that the update was successful, wherein based on the appending, the persistence buffer inserts, in the record, a unique timestamp, responsive to determining that a second FIFO memory queue in the persistence buffer is full, setting a trigger for an update processor executed by a second logical partition of the computer system, and selecting the first FIFO memory queue as active, wherein the second FIFO memory queue was active prior to the selecting of the first FIFO memory queue, and wherein the associated transaction data represents a sequence of updates to fields within objects stored in the in-memory database, wherein the persistence buffer is executed by the second logical partition of the computer system, and wherein the transaction data associated with the transaction comprises data fields of objects modified by the transaction and for each data field of data fields of objects modified by the transaction, a respective object identifier identifying an object of the objects modified by the transaction;

responsive to completing writing the record of the transaction to the persistence buffer, notifying, by the in-memory database, the application, that the update was successful;

responsive to the committing, the in-memory database, continuing with the receiving, the update processor concurrently obtaining the trigger from the in-memory database;

extracting, by the update processor, last transaction data associated with each transaction of the in-memory database from the second FIFO memory queue;

determining, by the update processor, for the last transaction data associated with each transaction, if the transaction data comprises updates to data fields in the in-memory database which were processed after obtaining the trigger;

responsive to determining that the last transaction data comprises updates to data fields in the in-memory database were processed after obtaining the trigger, updating a store queue with the extracted transaction data;

responsive to determining that the last transaction data comprises updates to data fields in the in-memory database were not processed after obtaining the trigger, storing the last transaction data in the store queue and remembering fields updated by the transaction data in the in-memory database; and based on completing the extracting, identifying a newest value for one of the fields within the objects extracted from the second FIFO memory queue, wherein the objects in the second FIFO memory queue comprise the objects of the in-memory database, and retaining in the store queue, only the newest value for the one of the fields in a data structure comprising values for each data field changed during the transaction processing;

asynchronously from processing the transaction, periodically saving, in a backing store, the newest value, wherein the backing store represents a consistent overall state of the in memory database at a time of the saving, wherein the overall state consists of a newest value for each of the fields in the in-memory database;

acknowledging, by the update processor, completion of saving to the backing store the consistent overall state of the in memory database, during the periodically saving, wherein the time of the saving of the consistent overall state is a first time; and loading into the in-memory database, from the backing store, the in-memory database, wherein the loading comprises restoring a state of the in-memory database to the consistent overall state utilizing the newest values of the fields;

based on the loading, cleaning up the data structure and the backing store, wherein cleaning up the backing store comprises removing values of the fields in the backing store saved after the first time based on the periodically saving.

2. The method of claim 1, wherein the in-memory database is an object-oriented database.

3. The method of claim 1, wherein the method is implemented via a computer program product loadable into the internal memory of a digital computer system and comprising software code portions for performing the method when said computer program is run on said computer system.

4. A computer program product for facilitating operation of a volatile in-memory database, the computer program product comprising:

a non-transitory storage medium readable by a processor and storing instructions for execution by the processor for performing a method comprising:

processing, by the in-memory database, a transaction to modify content of the in-memory database, wherein the transaction comprises an update, the processing comprising:

receiving, by the in-memory database, from an application comprising a massively multiplayer online game (MMOG), wherein the MMOG supports multiple players, wherein each player is represented by an object comprising additional objects, the transaction, wherein the in- memory database and the application are executed by a first logical partition of a computer system;

executing, by the in-memory database, a commit function of the in-memory database, wherein the commit function of the in-memory database stores transaction data associated with the transaction in the in-memory database and intercepting the commit function to write the associated transaction data to a first FIFO memory queue in a persistence buffer by appending a record of the transaction to a sequential file before notifying the application that the update was successful, wherein based on the appending, the persistence buffer inserts, in the record, a unique timestamp, responsive to determining that a second FIFO memory queue in the persistence buffer is full, setting a trigger for an update processor executed by a second logical partition of the computer system, and selecting the first FIFO memory queue as active, wherein the second FIFO memory queue was active prior to the selecting of the first FIFO memory queue, and wherein the associated transaction data represents a sequence of updates to fields within objects stored in the in-memory database, wherein the persistence buffer is executed by the second logical partition of the computer system, and wherein the transaction data associated with the transaction comprises data fields of objects modified by the transaction and for each data field of data fields of objects modified by the transaction, a respective object identifier identifying an object of the objects modified by the transaction;

responsive to completing writing the record of the transaction to the persistence buffer, notifying, by the in-memory database, the application, that the update was successful;

responsive to the committing, the in-memory database, continuing with the receiving, the update processor concurrently obtaining the trigger from the in-memory database;

extracting, by the update processor, last transaction data associated with each transaction of the in-memory database from the second FIFO memory queue;

determining, by the update processor, for the last transaction data associated with each transaction, if the transaction data comprises updates to data fields in the in-memory database which were processed after obtaining the trigger;

responsive to determining that the last transaction data comprises updates to data fields in the in-memory database were processed after obtaining the trigger, updating a store queue with the extracted transaction data;

responsive to determining that the last transaction data comprises updates to data fields in the in-memory database were not processed after obtaining the trigger, storing the last transaction data in the store queue and remembering fields updated by the transaction data in the in-memory database; and based on completing the extracting, identifying a newest value for one of the fields within the objects extracted from the second FIFO memory queue, wherein the objects in the second FIFO memory queue comprise the objects of the in-memory database, and retaining in the store queue, only the newest value for the one of the fields in a data structure comprising values for each data field changed during the transaction processing;

asynchronously from processing the transaction, periodically saving, in a backing store, the newest value, wherein the backing store represents a consistent overall state of the in memory database at a time of the saving, wherein the overall state consists of a newest value for each of the fields in the in-memory database;

acknowledging, by the update processor, completion of saving to the backing store the consistent overall state of the in memory database, during the periodically saving, wherein the time of the saving of the consistent overall state is a first time; loading into the in-memory database, from the backing store, the in-memory database, wherein the loading comprises restoring a state of the in- memory database to the consistent overall state utilizing the newest values of the fields; and based on the loading, cleaning up the data structure and the backing store, wherein cleaning up the backing store comprises removing values of the fields in the backing store saved after the first time based on the periodically saving.

5. The computer program product of claim 4, wherein the in-memory database is an object-oriented database.

6. The computer program product of claim 4, wherein the computer program product is loadable into the internal memory of a computer system and comprises software code portions for performing the method when said software code portions are run on said computer system.

7. A computer system for facilitating operation of a volatile in-memory database, the computer system comprising:

a memory; and a processor in communications with the memory, wherein the computer system is configured to perform a method, the method comprising:

processing, by the in-memory database, a transaction to modify content of the in-memory database, wherein the transaction comprises an update, the processing comprising:

receiving, by the in-memory database, from an application comprising a massively multiplayer online game (MMOG), wherein the MMOG supports multiple players, wherein each player is represented by an object comprising additional objects, the transaction, wherein the in-memory database and the application are executed by a first logical partition of a computer system;

executing, by the in-memory database, a commit function of the in-memory database, wherein the commit function of the in-memory database stores the transaction data associated with the transaction in the in-memory database and intercepting a commit function to write the associated transaction data to a first FIFO memory queue in a persistence buffer by appending a record of the transaction to a sequential file before notifying the application that the update was successful, wherein based on the appending, the persistence buffer inserts, in the record, a unique timestamp, responsive to determining that a second FIFO memory queue in the persistence buffer is full, setting a trigger for an update processor executed by a second logical partition of the computer system, and selecting the first FIFO memory queue as active, wherein the second FIFO memory queue was active prior to the selecting of the first FIFO memory queue, and wherein the associated transaction data represents a sequence of updates to fields within objects stored in the in-memory database, wherein the persistence buffer is executed by the second logical partition of the computer system, and wherein the transaction data associated with the transaction comprises data fields of objects modified by the transaction and for each data field of data fields of objects modified by the transaction, a respective object identifier identifying an object of the objects modified by the transaction;

responsive to completing writing the record of the transaction to the persistence buffer, notifying, by the in-memory database, the application, that the update was successful;

responsive to the committing, the in-memory database, continuing with the receiving, the update processor concurrently obtaining the trigger from the in-memory database; extracting, by the update processor, last transaction data associated with each transaction of the in-memory database from the second FIFO memory queue;

determining, by the update processor, for the last transaction data associated with each transaction, if the transaction data comprises updates to data fields in the in-memory database which were processed after obtaining the trigger;

responsive to determining that the last transaction data comprises updates to data fields in the in-memory database were processed after obtaining the trigger, updating a store queue with the extracted transaction data;

responsive to determining that the last transaction data comprises updates to data fields in the in-memory database were not processed after obtaining the trigger, storing the last transaction data in the store queue and remembering fields updated by the transaction data in the in-memory database; and based on completing the extracting, identifying a newest value for one of the fields within the objects extracted from the second FIFO memory queue, wherein the objects in the second FIFO memory queue comprise the objects of the in-memory database, and retaining in the store queue, only the newest value for the one of the fields in a data structure comprising values for each data field changed during the transaction processing;

asynchronously from processing the transaction, periodically saving, in a backing store, the newest value, wherein the backing store represents a consistent overall state of the in memory database at a time of the saving, wherein the overall state consists of a newest value for each of the fields in the in-memory database;

acknowledging, by the update processor, completion of saving to the backing store the consistent overall state of the in memory database, during the periodically saving, wherein the time of the saving of the consistent overall state is a first time;

loading into the in-memory database, from the backing store, the in- memory database, wherein the loading comprises restoring a state of the in- memory database to the consistent overall state utilizing the newest values of the fields; and based on the loading, cleaning up the data structure and the backing store, wherein cleaning up the backing store comprises removing values of the fields in the backing store saved after the first time based on the periodically saving.

8. The computer system of claim 7, wherein the in-memory database is an object-oriented database.

9. The computer system of claim 7, wherein the method is implemented via a computer program product loadable into the internal memory of a digital computer system and comprising software code portions for performing the method when said computer program is run on said computer system.

* * * * *